United States Patent
Danforth et al.

(10) Patent No.: US 10,023,505 B2
(45) Date of Patent: Jul. 17, 2018

(54) METHOD OF PRODUCING SOLID PROPELLANT ELEMENT

(71) Applicant: Raytheon Company, Waltham, MA (US)

(72) Inventors: Jeremy C. Danforth, Tucson, AZ (US); Matt H. Summers, Marana, AZ (US); David G. Garrett, Tucson, AZ (US)

(73) Assignee: Raytheon Company, Waltham, MA (US)

(*) Notice: Subject to any disclaimer, the term of this patent is extended or adjusted under 35 U.S.C. 154(b) by 241 days.

(21) Appl. No.: 15/057,587

(22) Filed: Mar. 1, 2016

(65) Prior Publication Data
US 2017/0253537 A1 Sep. 7, 2017

(51) Int. Cl.
| | |
|---|---|
| *C06B 21/00* | (2006.01) |
| *C06B 45/00* | (2006.01) |
| *F02K 9/10* | (2006.01) |
| *B29C 64/106* | (2017.01) |
| *B33Y 10/00* | (2015.01) |

(52) U.S. Cl.
CPC ........ *C06B 21/0075* (2013.01); *B29C 64/106* (2017.08); *C06B 45/00* (2013.01); *F02K 9/10* (2013.01); *B33Y 10/00* (2014.12)

(58) Field of Classification Search
CPC ....... C06B 21/0075; C06B 45/00; F02K 9/10; B29C 64/106; B33Y 10/00
See application file for complete search history.

(56) References Cited

U.S. PATENT DOCUMENTS

| | | |
|---|---|---|
| 3,358,453 A | 12/1967 | Swet |
| 3,806,064 A | 4/1974 | Parilla |
| 4,085,584 A | 4/1978 | Jones et al. |
| 5,119,627 A | 6/1992 | Bradford et al. |

(Continued)

FOREIGN PATENT DOCUMENTS

| | | |
|---|---|---|
| WO | 1995/017358 A1 | 6/1995 |
| WO | 2013/019876 A2 | 2/2013 |

OTHER PUBLICATIONS

International Search Report and the Written Opinion for corresponding International Application No. PCT/US2016/056376 dated Dec. 14, 2016.

(Continued)

*Primary Examiner* — Nahida Sultana
(74) *Attorney, Agent, or Firm* — Renner, Otto, Boisselle & Sklar, LLP

(57) ABSTRACT

A method of producing a propellant material element, such as an electrically-operated propellant material, includes extruding a propellant material through a heated nozzle. The nozzle may be heated to a temperature that is above the boiling point of a solvent that is part of the propellant material, yet is below a decomposition temperature of the propellant material. This allows some of the solvent to be driven off during the extruding process, while still preventing initiation of an energy-creating reaction within the material. The heating of the material in the extruding process, and especially the heating of the nozzle that the material is extruded through, may be controlled to remove an amount of solvent that results in the extruded material having desirable properties.

20 Claims, 1 Drawing Sheet

(56) References Cited

U.S. PATENT DOCUMENTS

| | | | |
|---|---|---|---|
| 5,600,946 A | 2/1997 | Dombrowski et al. | |
| 6,499,287 B1 | 12/2002 | Taylor | |
| 7,540,145 B2 | 6/2009 | Rutan | |
| 8,601,790 B2* | 12/2013 | Fuller | F02K 9/10 |
| | | | 102/287 |
| 8,950,329 B2 | 2/2015 | Villarreal et al. | |
| 9,138,981 B1* | 9/2015 | Hirsch | B33Y 70/00 |
| 9,543,479 B2* | 1/2017 | Herrmann | H01L 33/486 |
| 2002/0113331 A1* | 8/2002 | Zhang | B29C 41/003 |
| | | | 264/40.1 |
| 2006/0272754 A1* | 12/2006 | Dixon | C06B 23/007 |
| | | | 149/19.4 |
| 2012/0311993 A1 | 12/2012 | Mihara et al. | |
| 2014/0174313 A1 | 6/2014 | Villarreal et al. | |
| 2014/0259895 A1* | 9/2014 | Mason | C10L 5/44 |
| | | | 44/589 |
| 2014/0361460 A1* | 12/2014 | Mark | B29C 70/521 |
| | | | 264/248 |
| 2015/0054200 A1* | 2/2015 | Fruth | B22F 3/1055 |
| | | | 264/405 |
| 2015/0307385 A1* | 10/2015 | Klein | C03B 25/02 |
| | | | 65/29.11 |
| 2015/0322892 A1 | 11/2015 | Whitmore et al. | |
| 2016/0185039 A1* | 6/2016 | Carbone | B29C 67/0088 |
| | | | 425/375 |
| 2016/0251486 A1* | 9/2016 | Cernohous | C08J 5/046 |
| | | | 264/308 |
| 2017/0157845 A1* | 6/2017 | Bihari | B33Y 10/00 |
| 2017/0218228 A1* | 8/2017 | Jose | C09D 189/00 |
| 2017/0253536 A1* | 9/2017 | Danforth | C06B 21/0075 |

OTHER PUBLICATIONS

Jones, "Hybrid Rocket Engines Use Additive Manufacturing to Combine the Advantages of Solid and Liquid Propellants", Oct. 15, 2010, pp. 1-3, retrieved from the Internet: http://www.stratasys.com/resources/case-studies/aerospace/rocket-crafters [retrieved on Feb. 24, 2016].

* cited by examiner

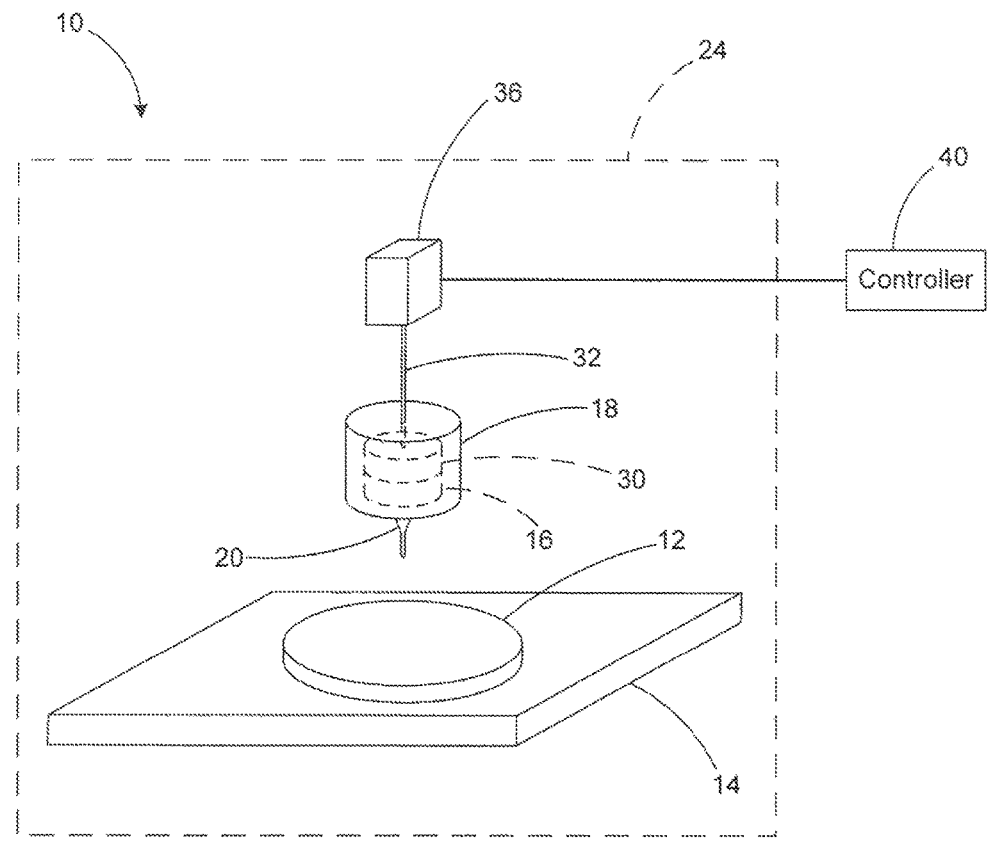
FIG. 1
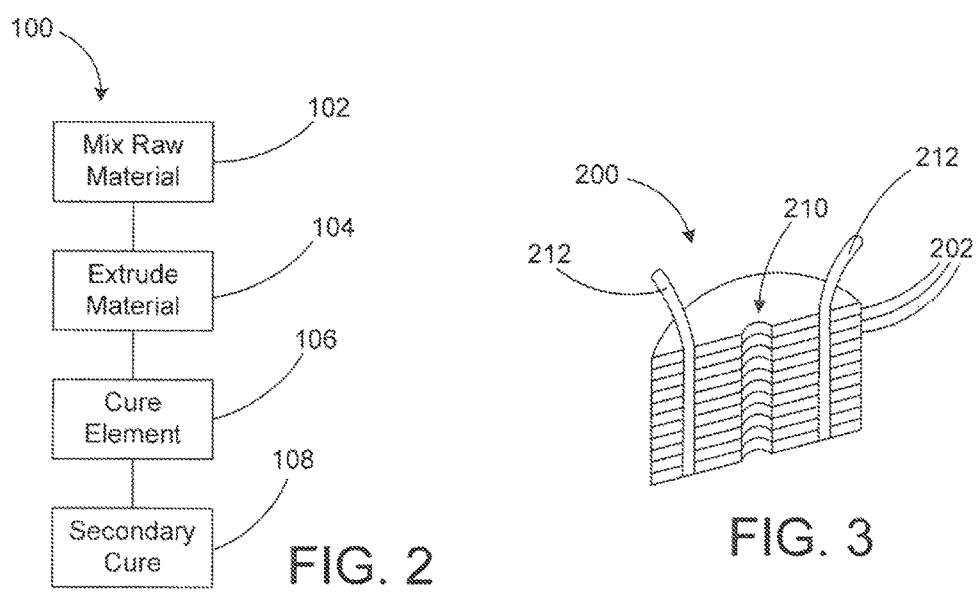
FIG. 2
FIG. 3

METHOD OF PRODUCING SOLID PROPELLANT ELEMENT

FIELD OF THE INVENTION

The invention relates to solid propellant materials and elements, and methods of producing solid propellant elements.

DESCRIPTION OF THE RELATED ART

Solid propellant elements may be made by methods such as casting or molding. However such methods are limited in the shapes that can be obtained. In addition, it may be difficult to obtain uniformity in properties for a cast or molded solid propellant element.

SUMMARY OF THE INVENTION

A solid propellant element is made using an additive manufacturing process, such as extrusion.

A solid propellant element is made by extruding solid propellant material through a heated nozzle.

A solid propellant material may be additively manufactured from a raw propellant material that includes an excess amount of solvent, beyond what would be used for a molded or cast product. At least some of the excess solvent may be removed when the raw propellant material is extruded, such as when the material is passed through a heated nozzle.

The solid propellant element may be made of an electrically-operated propellant material.

According to an aspect of the invention, a method of additively manufacturing a solid propellant element includes the steps of: heating a nozzle to produce a heated nozzle; and extruding through the heated nozzle a propellant material that includes a solvent, to form the solid propellant element. The extruding occurs when the heated nozzle is at a temperature that above a boiling point of the solvent and below a decomposition temperature of the propellant material. The extruding removes some of the solvent from the propellant material.

According to an embodiment of the method of any paragraph(s) of this summary, the solvent is water and/or glycerol.

According to an embodiment of the method of any paragraph(s) of this summary, the extruding through the heated nozzle removes some of the water from the propellant material.

According to an embodiment of the method of any paragraph(s) of this summary, the extruding includes extruding through a heated nozzle that is between 100 and 210 degrees C.

According to an embodiment of the method of any paragraph(s) of this summary, the extruding includes extruding through a heated nozzle that is between 150 and 210 degrees C.

According to an embodiment of the method of any paragraph(s) of this summary, the extruding includes directing the propellant material from a reservoir of the propellant material, to the heated nozzle.

According to an embodiment of the method of any paragraph(s) of this summary, the directing includes using a stepper motor to control flow of the propellant material from the reservoir to the heated nozzle.

According to an embodiment of the method of any paragraph(s) of this summary, the using includes using software to control the stepper motor.

According to an embodiment of the method of any paragraph(s) of this summary, the propellant material is an electrically-operated propellant material; and According to an embodiment of the method of any paragraph(s) of this summary, the extruding produces an electrically-operated solid propellant element as the solid propellant element.

According to an embodiment of the method of any paragraph(s) of this summary, the extruding, by removing some of the solvent from the propellant material, makes the propellant material suitable for curing into the propellant element.

According to an embodiment of the method of any paragraph(s) of this summary, the propellant element is built up in layers on a platform, by the extruding.

According to an embodiment of the method of any paragraph(s) of this summary, the platform is a heated platform.

According to an embodiment of the method of any paragraph(s) of this summary, the layers each have a thickness of on the order of 0.1 mm.

According to an embodiment of the method of any paragraph(s) of this summary, the extruding is performed in a heated chamber.

According to an embodiment of the method of any paragraph(s) of this summary, the method includes embedding one or more devices in the propellant element during the extruding.

According to an embodiment of the method of any paragraph(s) of this summary, the propellant material is an electrically-operated propellant material; and According to an embodiment of the method of any paragraph(s) of this summary, the embedding includes embedding electrodes as at least some of the one or more devices.

According to an embodiment of the method of any paragraph(s) of this summary, the method includes, prior to the heating and the extruding, mixing the propellant material, combining together a fuel, the solvent, an oxidizer, and a binder;

According to an embodiment of the method of any paragraph(s) of this summary, the mixing includes combining an excess amount of the solvent, beyond that that would be used to form a cast or molded cured propellant element.

According to an embodiment of the method of any paragraph(s) of this summary, the extruding includes extruding the propellant material in a partially cured state.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings, which are not necessarily to scale, show various aspects of the invention.

FIG. 1 is an oblique view of a system for producing a solid propellant element, according to an embodiment of the present invention.

FIG. 2 is a high-level flow chart of a method for additively manufacturing a solid propellant element, according to an embodiment of the present invention.

FIG. 3 is an oblique view, partially in cross section, of a solid propellant element, according to an embodiment of the present invention.

DETAILED DESCRIPTION

A method of producing a propellant material element, such as an electrically-operated propellant material, includes extruding a propellant material through a heated nozzle. The nozzle may be heated to a temperature that is above the boiling point of a solvent that is part of the raw propellant material, yet is below a decomposition temperature of the propellant material. This allows some of the solvent to be driven off during the extruding process, while still preventing initiation of an energy-creating reaction within the material. The heating of the material in the extruding process, and especially the heating of the nozzle that the material is extruded through, may be controlled to remove an amount of solvent that results in the extruded material having desirable properties. These desirable properties include the material being able to maintain its shape well, being able to adhere to previous layers of material (and being able to have subsequent layers of material adhere to it), and final solid element being able function as a propellant, to produce pressurized gasses when activated, such as by use of electricity or another activation source.

FIG. 1 shows a system 10 used for printing or otherwise additively manufacturing a propellant element 12. The element 12 is additively manufactured layer by layer on a platform or bed 14, using raw propellant material 16 that is stored in a reservoir 18, and is extruded through a heated nozzle 20. The process is carried out in a chamber 24, which may be a heated chamber.

The propellant material 16 may be any of a variety of materials that burn to produce pressurized gases. One class of propellant materials are materials that produce an electrically-activated (or electrically operated) solid propellant. Examples of such materials may be found in US Patent Publication 2014/0174313 A1, which is incorporated herein by reference in its entirety. As described in that publication, a source material for making an electrically-operated solid propellant may include an oxidizer, a fuel, and a binder. The oxidizer may be a liquid-based perchlorate oxidizer that includes aluminum perchlorate, barium perchlorate, calcium perchlorate, lithium perchlorate, magnesium perchlorate, perchlorate acid, strontium perchlorate, and/or sodium perchlorate, to give a few examples. The fuel may be a metal-based fuel, for example including tungsten, magnesium, copper oxide, copper, titanium, and/or aluminum. The binder may include casein, methyl cellulose, polyethylene oxide, polyvinyl acetate, and/or polyvinyl alcohol. In one example, a material used in an additive manufacturing process may have 150-250% of the solvent (by weight percentage) as that used for a bulk cast or molded material that is produced in a non-additive process.

The electrically operated propellant ignites with the application of electricity and correspondingly extinguishes with the cessation of electricity, even when exposed to high pressures, though below a high pressure threshold. For example, when exposed to ambient or high pressures within the casing 22, such as atmospheric pressure, pressures greater than 200 psi, 500 psi, 1000 psi, 1500 psi and up to 2000 psi, the electrically operated propellant is extinguished with the interruption of electricity (e.g., voltage or current) applied across the electrically operated propellant. In other words, without application of electricity, the combustion of the electrically operated propellant is not self-sustaining at high pressures, such as high pressures of 200 psi or more and less than 2000 psi. Thus, the electrically operated propellant is configured for "on" and "off" operation under the described variety of conditions.

The oxidizer may be an aqueous solution, with the oxidizer material dissolved in water and/or glycerol. It has been found that controlling the amount of water and/or glycerol in the extruded material is important in additive manufacture of the propellant element 12. Too much solvent in the printed mixture can cause problems with curing the extruded material and having the extruded material properly maintain its shape. Too little solvent can result in problems with the material adhering to other material layers.

The raw propellant material that is used to additively manufacture the propellant element 12 may have any of a variety of other suitable formulations. Broadly, the raw propellant material may include a fuel, a solvent (e.g., water or glycerol), an oxidizer, and a binder. The fuel and the oxidizer are the chemically-active components that react with one another to produce the pressurized gases.

The solvent receives the fuel and other components, to allow mixing together of the components into a flowable material. The binder aids in maintaining the raw material as a unified material that can be cured and/or dried into a solid mass.

To aid in controlling the content of water and/or glycerol (or other solvent) in the extruded material, the nozzle 20 may be heated to a higher temperature than that in the general environment of the chamber 24. The nozzle 20 may be heated to a temperature that is at least that of the boiling point of the solvent (such as water and/or glycerol) that is in the raw propellant material, but is below a temperature at which the raw propellant material decomposes. The decomposition may involve a heat-producing chemical reaction. This allows for removal of solvent material while still preserving the capability of the extruded material to function as a propellant (to later undergo the chemical reaction between the fuel and the oxidizer that produces propellant products such as pressurized gases). In addition, chemical reaction of the fuel and the oxidizer during the manufacturing process is undesirable in that it produces heat and combustion products, which can damage the manufacturing system.

To give one example temperature range, the heated nozzle 20 may be between 100 and 210 degrees C. More narrowly, the heated nozzle 20 may be between 150 and 210 degrees C., between 100 and 160 degrees C., between 100 and 180 degrees C., or between 150 and 180 degrees. Other suitable temperature ranges for the heated nozzle 20 may be possible.

The nozzle 20 may be heated by any of a variety of suitable mechanisms. For instance, the nozzle 20 may be electrically heated, with the electrical heating perhaps controlled by a feedback mechanism, to control the temperature of the nozzle 20.

The heated nozzle 20 may have an opening, though which the raw material 16 is extruded, that has a diameter of from 0.3 mm to 0.7 mm. Other suitable sizes and/or shapes for an opening may also be used. The addition of extra water and/or glycerol (extra solvent) in the raw propellant material 16 aids in preventing jamming of material in the heated nozzle 20 during the additive manufacturing (extruding) process.

As noted above, the chamber 24 itself may be operated at an elevated temperature (a temperature above the ambient temperature outside of the chamber 24). The chamber 24 may also have a controlled atmosphere within it, for example to prevent reactions with the elevated temperature propellant material. In addition, the platform or bed 14 may have an elevated, controlled temperature. The heating of the chamber 24 and/or the bed 14 may be done to help prevent or reduce thermal gradients in the extruded propellant material. Such thermal gradients may cause warping in the finished propellant element. However heating of the chamber 24 and the bed 14 may be omitted.

The reservoir 18 may be a heated pressure pot, as shown in FIG. 1. The reservoir 18 may be heated to a desired temperature, for example to 30 to 90 degrees C., or to another suitable temperature. The temperature of the reservoir 18 may be chosen to maintain the raw propellant material at a desired semi-cured stated and at a desired viscosity, to facilitate extrusion, deposition, and curing the material 16.

A piston 30 is used to press down against the raw propellant material 16 in the reservoir 18, to push the raw propellant material 16 through the heated nozzle 20, to extrude the material 16 onto the bed 14. An extrusion control rod 32 is used to attach the piston 30 to a stepper motor 36. The stepper motor 36 is controlled by a controller 40, such as a computer, to actuate the stepper motor 36 as needed to provide the desired flow of the raw propellant material 16.

The stepper motor 36 and the controller 40 may be similar to corresponding parts in other additive manufacturing systems. This means that the system 10 can interface with standard types of controllers, and/or that software and/or hardware used for other additive manufacturing systems may also be usable for the system 10.

To produce the propellant element 12 the raw propellant material 16 is fed through the heated nozzle 20, depositing the material 16 as a new layer on top of the bed 14 (or on top of a previously deposited layer). The propellant material 16 may be placed in dollops or amounts of on the order of 0.1 mm in extent (in all directions), for example with each layer of the propellant element 12 having a similar thickness. Each deposited increment (slug, drop, or dollop) of the material 16 may correspond to a small movement of the piston 30 by the stepper motor 36. The heated nozzle 20 and the bed 14 may move relative to one another in order to position the nozzle 20 where the extruded material is to be deposited over the bed 14.

The propellant material 16 may be in a semi-cured (partially cured) state as it is extruded from the heated nozzle 20. The heated nozzle 20 not only removes some of the solvent from the propellant material 16 that passes through it, the heated nozzle 20 also advances the cure state of the propellant material 16. For example, if there is a cross-linking agent, also known as curative, in the mixture, its cure time is a function of temperature, with the cross-linking agent curing more quickly at higher temperatures. After extrusion, curing of the propellant material 16 is completed, with further curing occurring within the chamber 24, during and/or after deposition of additional layers of the propellant material 16, and/or after removal of the propellant element 12 from the chamber 24. For example, further curing may occur in an oven or other elevated temperature environment that is outside of the chamber 24.

The use of an additive manufacturing process may facilitate the curing of the propellant material element 12. Extrusion of the propellant material 16 in a series of layers may result in a more uniform solvent content in different parts of the material, relative to other manufacturing processes such as casting of an element as a single piece, followed by curing.

Another goal in the extrusion process is to remove enough of the solvent, such as water and/or glycerol, from the raw propellant material 16, so that bubbles, such as bubbles of vaporized solvent, are not present when the material 16 passes through the heated nozzle 20. One goal of controlling the temperature of various parts of the process may therefore be to control the removal of solvent, such as the evaporation of water and/or glycerol, to avoid formation of such bubbles in the material 16.

FIG. 2 shows a high-level flow chart of a method 100 for producing the propellant element 12 (FIG. 1). In step 102 the raw propellant material 16 (FIG. 1) is mixed. This mixture process has been described above. One important aspect of the mixture process is adding an appropriate amount of the solvent, such as water and/or glycerol, in order that the raw propellant material 16 is able to be used in the extrusion or other additive manufacture process, to produce a propellant element that is properly curable and usable as a propellant.

After the mixing, in step 104 the raw propellant material 16 (FIG. 1) is placed in the reservoir 18 (FIG. 1) and is extruded through the heated nozzle 20 (FIG. 1). The propellant element 12 (FIG. 1) is built up layer by layer, as described above. It will be appreciated that additive manufacturing allows the formation of complicated shapes that are difficult to form, or even impossible to form, using other manufacturing techniques, such as casting, molding, or machining from a solid block. For example, the additive manufacturing may enable formation of one or more voids within the element 12 for various purposes, such as for use as a combustion chamber. In addition, the additive manufacturing may be used to put into place other parts, such as electrodes for igniting the propellant element 12, within the propellant element 12.

In step 106 the propellant element 12 (FIG. 1) is cured. As discussed above, some of curing may occur prior to the deposition of the raw propellant material 16 (FIG. 1). Additional curing may occur during the deposition of additional layers of the propellant material 16, and/or after the completion of the addition of the propellant material 16 to produce the propellant element 12. This additional curing may involve a secondary cure process in step 108, performed for example in a heated oven after the propellant element 12 has been built up layer by layer.

As described above, the raw propellant material 16 initially has extra solvent (e.g., water and/or glycerol) added, such that the raw propellant material 16 would be incapable of proper curing if it were deposited without first removing some of the extra solvent. If one were to try to cure the material with the overabundance of solvent, the curing would likely be incomplete, with a skin of cured material forming on the outside of the material that would inhibit further curing of the material within the skin, preventing full curing. In extruding the raw propellant material 16 through the heated nozzle 20, some of the solvent is removed, increasing the mass percentage (mass fraction) of the material 16 that is extruded and deposited. This material with some of the solvent removed is what is finally cured to produce the propellant element 12.

FIG. 3 shows a solid material element 200 that may be produced as described above. The element 200 is made up multiple layers 202 of material, piled one on top of another. The element 200 may define one or more cavities therewithin, such as a combustion cavity 210 that is surrounded by the propellant material of the element 200. Electrodes 212 are embedded in the element 200 during the fabrication process.

The propellant element 200 may be used as a gas generation system for generating combustion gases, such as for purposes of propelling a munition, and for example a projectile. The gas generation system is configured to provide more than one gas propulsion pulse, and thus all included propellant charges may not be burned simultaneously. It will of course be appreciated that the gas generation system may be used to provide propulsion for any projectile, such as a missile, bomb, smart bomb, supply container etc. The gas generation system may alternatively be used for other purposes, such as to drive a turbine, to operate a pressure driven mechanical device, to provide tank gas pressurization, etc.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of additively manufacturing a solid propellant element, the method comprising:
    heating a nozzle to produce a heated nozzle;
    extruding through the heated nozzle a propellant material that includes a fuel and a solvent, to form the solid propellant element;
    wherein the extruding occurs when the heated nozzle is at a temperature that is above a boiling point of the solvent and below a decomposition temperature of the propellant material;
    wherein the extruding removes some of the solvent from the propellant material;
    wherein the solvent is water and/or glycerol; and
    wherein the extruding through the heated nozzle removes some of the water and/or glycerol from the propellant material.

2. The method of claim 1, wherein the extruding includes extruding through a heated nozzle that is between 100 and 210 degrees C.

3. The method of claim 2, wherein the extruding includes extruding through a heated nozzle that is between 150 and 210 degrees C.

4. The method of claim 1, wherein the extruding includes directing the propellant material from a reservoir of the propellant material, to the heated nozzle.

5. The method of claim 4, wherein the directing includes using a stepper motor to control flow of the propellant material from the reservoir to the heated nozzle.

6. The method of claim 5, wherein the using includes using software to control the stepper motor.

7. The method of claim 1,
    wherein the propellant material is an electrically-operated propellant material; and
    wherein the extruding produces an electrically-operated solid propellant element as the solid propellant element.

8. The method of claim 1, wherein the extruding, by removing some of the solvent from the propellant material, makes the propellant material suitable for curing into the propellant element.

9. The method of claim 1, wherein the propellant element is built up in layers on a platform, by the extruding.

10. The method of claim 9, wherein the platform is a heated platform.

11. The method of claim 9, wherein the layers each have a thickness of on the order of 0.1 mm.

12. The method of claim 1, wherein the extruding is performed in a heated chamber.

13. A method of additively manufacturing a solid propellant element, the method comprising:
    heating a nozzle to produce a heated nozzle;
    extruding through the heated nozzle a propellant material that includes a solvent, to form the solid propellant element;
    embedding one or more devices in the propellant element during the extruding;
    wherein the extruding occurs when the heated nozzle is at a temperature that above a boiling point of the solvent and below a decomposition temperature of the propellant material; and
    wherein the extruding removes some of the solvent from the propellant material.

14. The method of claim 13,
    wherein the propellant material is an electrically-operated propellant material; and
    wherein the embedding includes embedding electrodes as at least some of the one or more devices.

15. A method of additively manufacturing a solid propellant element, the method comprising:
    heating a nozzle to produce a heated nozzle;
    extruding through the heated nozzle a propellant material that includes a solvent, to form the solid propellant element;
    prior to the heating and the extruding, mixing the propellant material, combining together a fuel, the solvent, an oxidizer, and a binder;
    wherein the extruding occurs when the heated nozzle is at a temperature that above a boiling point of the solvent and below a decomposition temperature of the propellant material;
    wherein the extruding removes some of the solvent from the propellant material; and
    wherein the mixing includes combining an excess amount of the solvent, beyond that that would be used to form a cast or molded cured propellant element.

16. A method of additively manufacturing a solid propellant element, the method comprising:
    heating a nozzle to produce a heated nozzle;
    extruding through the heated nozzle a propellant material that includes a solvent, to form the solid propellant element;
    wherein the extruding occurs when the heated nozzle is at a temperature that above a boiling point of the solvent and below a decomposition temperature of the propellant material;
    wherein the extruding removes some of the solvent from the propellant material; and wherein the extruding includes extruding the propellant material in a partially cured state.

17. The method of claim 16,
wherein the solvent is water and/or glycerol; and
wherein the extruding through the heated nozzle removes some of the water and/or glycerol from the propellant material.

18. The method of claim 16, wherein the extruding includes extruding through a heated nozzle that is between 100 and 210 degrees C.

19. The method of claim 16, wherein the extruding includes extruding through a heated nozzle that is between 150 and 210 degrees C.

20. The method of claim 15,
wherein the solvent is water and/or glycerol; and
wherein the extruding through the heated nozzle removes some of the water and/or glycerol from the propellant material.

\* \* \* \* \*